(12) United States Patent
Halahmi et al.

(10) Patent No.: US 8,329,273 B2
(45) Date of Patent: Dec. 11, 2012

(54) CREEP RESISTANT ARTICLE

(75) Inventors: Izhar Halahmi, Hod Hasharon (IL); Oded Erez, Tel Aviv (IL); Adi Erez, Tel Aviv (IL)

(73) Assignee: PRS Mediterranean Ltd., Tel Aviv (IL)

( * ) Notice: Subject to any disclaimer, the term of this patent is extended or adjusted under 35 U.S.C. 154(b) by 172 days.

(21) Appl. No.: 12/825,613

(22) Filed: Jun. 29, 2010

(65) Prior Publication Data

US 2011/0217498 A1    Sep. 8, 2011

Related U.S. Application Data

(60) Provisional application No. 61/311,028, filed on Mar. 5, 2010.

(51) Int. Cl.
*B29C 47/00* (2006.01)
(52) U.S. Cl. ...................................... 428/36.9; 428/116
(58) Field of Classification Search ................. 428/36.9, 428/116
See application file for complete search history.

(56) References Cited

U.S. PATENT DOCUMENTS

| | | | |
|---|---|---|---|
| 7,462,254 B2 * | 12/2008 | Halahmi et al. | 156/73.1 |
| 7,501,174 B2 * | 3/2009 | Halahmi et al. | 428/131 |
| 7,541,084 B2 * | 6/2009 | Halahmi et al. | 428/174 |
| 7,648,754 B2 * | 1/2010 | Halahmi et al. | 428/141 |
| 7,815,993 B2 * | 10/2010 | Hendren et al. | 428/116 |
| 8,026,309 B2 * | 9/2011 | Halahmi et al. | 525/66 |
| 2007/0160860 A1 | 7/2007 | Fiscus et al. | |
| 2008/0145597 A1 * | 6/2008 | Hendren et al. | 428/116 |
| 2008/0145600 A1 * | 6/2008 | Hendren et al. | 428/116 |
| 2008/0214699 A1 | 9/2008 | Halahmi et al. | |
| 2008/0286522 A1 * | 11/2008 | Khan et al. | 428/116 |
| 2009/0130380 A1 * | 5/2009 | Asakawa et al. | 428/116 |
| 2009/0252920 A1 * | 10/2009 | Khan et al. | 428/116 |
| 2011/0217498 A1 * | 9/2011 | Halahmi et al. | 428/36.9 |
| 2011/0244175 A1 * | 10/2011 | Kehrle et al. | 428/116 |
| 2011/0274873 A1 * | 11/2011 | Khan et al. | 428/116 |

OTHER PUBLICATIONS

International Search Report and Written Opinion, Authorized officer Lee W. Young, Date of mailing Aug. 19, 2010.

* cited by examiner

*Primary Examiner* — N. Edwards
(74) *Attorney, Agent, or Firm* — Richard M. Klein; Fay Sharpe LLP

(57) ABSTRACT

Disclosed are creep resistant articles having a polyolefin in a continuous phase and fibrils or lamellae of polyester, polyamide, or mixtures thereof dispersed in the continuous phase.

32 Claims, 3 Drawing Sheets

CREEP RESISTANT ARTICLE

This application claims priority to U.S. Provisional Patent Application Ser. No. 61/311,028, filed Mar. 5, 2010. The disclosure of that application is hereby fully incorporated by reference herein.

BACKGROUND

The present disclosure relates to creep resistant articles and processes for forming the same. Among other advantages, the articles are cost-effective and exhibit improved creep resistance.

Polyolefins are very useful in many industrial applications. However, low creep resistance, especially at elevated temperatures, is a limiting factor on the usage of polyolefins. Creep refers to the tendency of a polymeric material to permanently deform under the application of stress. Creep resistance is desired in order to maintain a desired shape over an extended period of time. When polyolefins are not suitable because of low creep resistance, expensive engineering polymers may be required for a particular application.

It would be desirable to develop more economical articles that have improved creep resistance.

BRIEF DESCRIPTION

The present application discloses, in various embodiments, creep resistant articles comprising an oriented polyolefin alloy. The oriented polyolefin alloy comprises (1) a continuous phase of a polyolefin and (2) a dispersed phase of a polyester, a polyamide, or mixtures thereof, wherein the polyester and/or polyamide form fibrils or lamellae. The polyolefin alloy and methods of producing the same are also disclosed.

Disclosed in embodiments is a creep resistant article, comprising: a continuous phase made of a polyolefin; and a dispersed phase in the form of fibrils or lamellae, made of polyester, polyamide or mixtures thereof; wherein the dispersed phase has an average thickness of at most 2 micrometers and an average length of at least 4 micrometers.

The article may be molded, extruded or formed in many shapes. In one embodiment, the article is in the form of a sheet, a strip, or a web. The thickness of the article is measured according to ASTM D 5199.

A 20 mm wide, 1.5 mm thick, and 100 mm long strip of the alloy can exhibit an accumulated creep strain of at most 10% when loaded by a 100 N weight and heated at 23 degrees C. for 1,000 hours. Alternatively, an article subjected to an average stress (load divided by average cross-sectional area) of 3.33 MPa will not plastically deform by more than 10% within 1000 hours at 23 degrees C.

In other embodiments, a 20 mm wide, 1.5 mm thick, and 100 mm long strip of the alloy may exhibit an accumulated creep strain of at most 10% when loaded by a 80 N weight and heated at 45 degrees C. for 1,000 hours. Alternatively, an article subjected to an average stress of 2.66 MPa will not plastically deform by more than 10% within 1000 hours at 45 degrees C. The term "stress" refers to the load divided by the average cross-sectional area of the tested specimen.

In other embodiments, a 20 mm wide, 1.5 mm thick, and 100 mm long strip of the alloy may exhibit an accumulated creep strain of at most 10% when loaded by a 60 N weight and heated at 55 degrees C. for 1,000 hours. Alternatively, an article subjected to an average stress of 2 MPa will not plastically deform by more than 10% within 1000 hours at 55 degrees C.

The allowed long term stress for design of the article may be at least 4 MPa at 23 Celsius according to ASTM D6992. The allowed long term stress for design of the article may alternatively be at least 3 MPa at 45 degrees C. according to ASTM D6992. The allowed long term stress for design of the article might be at least 2 MPa at 60 degrees C. according to ASTM D6992. The term "allowed long term stress for design" refer to the highest stress that results in plastic deformation of less than 10% after an extrapolated time of 50 years at 23 degrees C., by the stepped isothermal method, as described in ASTM D6992.

The creep resistant article could take the form of a geosynthetic article, a pipe or tube, or an agricultural film or sheet.

Also disclosed is a method for producing an oriented polyolefin alloy, comprising: melt kneading a precursor composition to form an alloy, the precursor composition comprising: (1) a polyolefin, (2) a second polymer selected from a polyester, a polyamide, or a mixture thereof, and (3) an optional compatibilizer; and applying tensile forces to the alloy to form fibrils or lamellae of the second polymer dispersed within a matrix formed by the polyolefin, thereby forming an oriented polyolefin alloy. The oriented second polymer serves as reinforcement to the polyolefin in the overall oriented alloy. Generally, the alloy is molded or extruded in the form of a sheet, film, web, grid, strip, pipe, or tube. The tensile forces are then applied to the extruded or molded alloy to obtain the oriented polyolefin alloy.

The method may further comprise cooling the alloy prior to applying tensile forces. Alternatively, the method may further comprise transferring the alloy in a molten phase to an extruder, injection molding machine, or blow molding machine. The method might further comprise extruding, injection molding, or blow molding the alloy to form a shape prior to applying the tensile forces. The shape may be a film, strip sheet, web, grid, tube, pipe, profile or membrane. The second polymer forms fibrils or lamellae in the polyolefin. Alternatively, the polyolefin can be referred to as a first phase, and the second polymer can be referred to as a second phase.

The tensile forces can be applied until the fibrils or lamellae have an aspect ratio of at least 2, or at least 3. The aspect ratio refers to the ratio between the longest dimension of a phase to the thinnest or shortest dimension of the phase.

The temperature of a surface of the molded or extruded alloy can be from 10 to 100 degrees C. when the tensile forces are applied at the point at which the forces are applied, or from 20 to 150 degrees C.

The alloy can be stretched in one direction or two directions by the tensile forces. During manufacturing, the tensile forces can be applied at one point or many points downstream of the production line.

Also disclosed is an oriented polyolefin alloy comprising: a polyolefin matrix; and a second polymer dispersed within the polyolefin matrix. The second polymer is a polyester, a polyamide, or a mixture of a polyester and a polyamide; and is in the form of fibrils or lamellae. The fibrils or lamellae have an aspect ratio of at least 2, or at least 3.

The oriented polyolefin alloy may further comprise a compatibilizer. The compatibilizer may be introduced to the alloy during or prior to the extrusion/molding stage, or during said stage The compatibilizer may comprise a copolymer of (a) an polyolefin and (b) an acrylic acid, a methacrylic ester, or an ester or amide thereof. Alternatively, the compatibilizer is (i) an ethylene-glycidyl acrylate copolymer or terpolymer; or (ii) an ethylene-glycidyl methacrylate copolymer or terpolymer. In other embodiments, the compatibilizer is (iii) a polyethylene homopolymer, copolymer, or terpolymer; or (iv) a polypropylene homopolymer, copolymer, or polypropylene terpolymer; and any of these can be modified by polar groups. Said polar groups are for example maleic anhydride, glycidyl acrylate or methacrylate and carboxylic acid.

The polyolefin in the oriented polyolefin alloy may comprise reactive groups, polar groups, or mixtures thereof. Exemplary polar groups include amine, carboxyl, amide, hydroxyl and ester. Exemplary reactive groups include anhydride and glycidyl. The second polymer comprises from about 1 to about 80 wt % of the oriented polyolefin alloy.

Also disclosed is a method for producing a polyolefin oriented article, comprising: forming a dispersion comprising (1) a polyolefin, (2) a polyester, polyamide, or a mixture thereof, and (3) an optional compatibilizer; and melt kneading the dispersion of (2) to form an alloy. The alloy can be melt extruded or molded directly or from a separate machine to form an article. The article surface is cooled to below 150 degrees C., preferably below 100 degrees C., and most preferably below 60 degrees C. Tensile forces are then applied onto the article through, for example, rolls or clamps to stretch the alloy and produce fibrils or lamellae of the polyester, polyamide, or mixture thereof in a matrix of the polyolefin.

The surface temperature of the molded or extruded article during the application of the tensile forces may be below the melting point of the polyolefin. In some embodiments, the polyolefin is polyethylene and the surface temperature during this beginning step is from about 10 to about 100 degrees C. In others, the polyolefin is polypropylene and the surface temperature during the beginning step is from about 10 to about 150 degrees C. The alloy can be stretched to apply the tensile forces.

The method may further comprise cooling the alloy after molding or extrusion, by exposing the alloy to air, water or a metallic object prior to stretching the alloy. Alternatively, the method may further comprise remelting, extruding, molding, or blow molding the alloy to form a film, tube, profile, or sheet prior to stretching.

The alloy can be stretched in one or two directions.

Also disclosed is an alternative method for producing a polyolefin alloy article, comprising: melt kneading (1) a polyolefin, (2) a polyester, polyamide, or a mixture thereof, and (3) an optional compatibilizer together to form an alloy; extruding, molding or blow molding the alloy to form an article; and stretching the article to produce fibrils or lamellae of the polyester, polyamide, or mixture thereof in a matrix of the polyolefin. The article may be in the shape of a film, strip, tube, profile, web, grid, or sheet.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
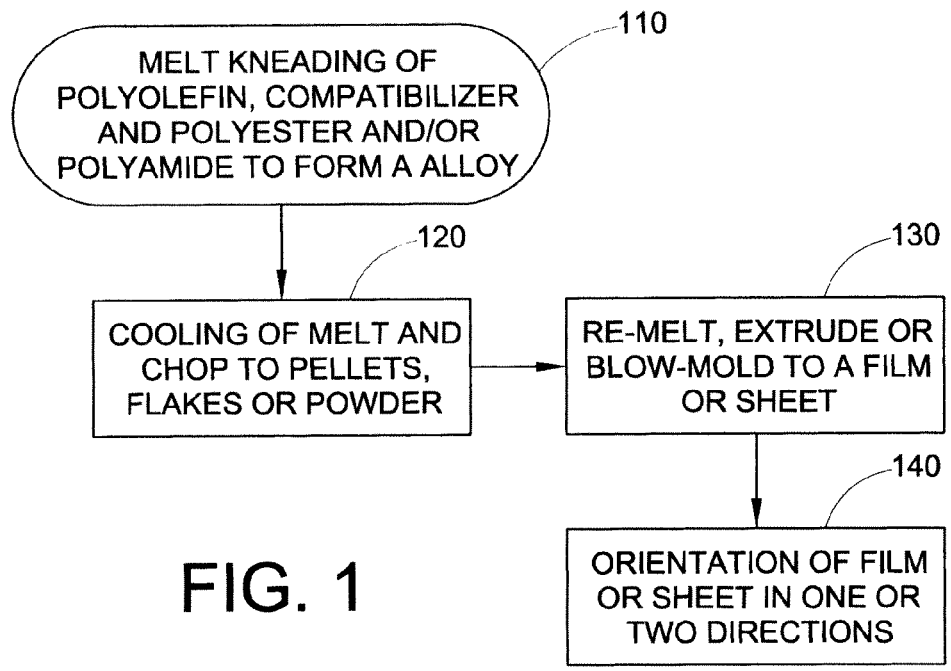
FIG. 1 is a flow chart describing an exemplary embodiment of a method for producing an oriented polyolefin alloy.

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

As used in the specification and in the claims, the term "comprising" includes the embodiments "consisting of" and "consisting essentially of."

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range of "from about 2 to about 10" also discloses the range "from 2 to 10."

The present disclosure relates to oriented polymeric alloys which are as easy to process and as relatively inexpensive as polyolefins, but have improved creep resistance. The oriented polyolefin alloy comprises a continuous phase and a dispersed phase. The continuous phase is formed from a first polymer, which is a polyolefin. The dispersed phase is formed from a second polymer which is in the form of fibrils or lamellae. The second polymer comprises a polyester, a polyamide, or mixtures thereof. The oriented polyolefin alloy is useful in products such as geosynthetic articles, grids, webs, geocells, pipes, tubes, agricultural films, or agricultural sheets. The disclosure also relates to methods for producing the alloy and articles formed therefrom.

The first polymer in the oriented polyolefin alloy is a polyolefin, which forms the continuous phase. In particular embodiments, the polyolefin is polyethylene or polypropylene. In more specific embodiments, the polyolefin is high density polyethylene ("HDPE"), which has a density of greater than 0.940 g/cm$^3$. The polyolefin may be a homopolymer (i.e. formed from only one monomer), a copolymer (i.e. formed from two or more monomers), or a terpolymer (i.e. formed from only three monomers). The copolymer may be a block copolymer or a graft copolymer.

The second polymer in the oriented polyolefin alloy forms the dispersed phase. The second polymer is a polyester, a polyamide, or a mixture thereof. An exemplary polyester is polyethylene terephthalate ("PET").

The second polymer forms a stable dispersion (i.e. dispersed phase) in the first polymer. The dispersed phase can be stabilized in at least two ways. First, the oriented polymer alloy may further comprise a compatibilizer. A compatibilizer is a material—usually a polymer, that emulsifies the dispersed phase and prevents the dispersed phase from reagglomeration during cooling from molten state. The compatibilizer also improves mechanical coupling between the dispersed phase and the continuous phase. For example, the compatibilizer may be a copolymer or terpolymer formed from (a) an olefin, such as ethylene or propylene; and (b) an acrylic acid or acrylic acid derivative. An exemplary acrylic acid derivative is an alkyl acrylate and glycidyl acrylate. The glycidyl group is the preferred group for compatibilization of polyester and polyolefin alloy. Exemplary compatibilizers include, but are not limited to, ethylene-acrylic acid copolymers, ethylene-glycidyl acrylate copolymers or terpolymers, and ethylene-glycidyl methacrylate copolymers or terpolymers. Alternatively, the polyolefin forming the continuous phase may be grafted to include functional groups or sidechains. Such grafting is usually conducted in a solvent or an melt kneader such as an extruder. Exemplary grafted polyolefins include polyolefins grafted with maleic anhydride, glycidyl acrylate, or glycidyl methacrylate. The polyolefin may also be subjected to free radicals to form functional groups, such as carbonyl, carboxyl, hydroxyl, etc., that acts to compatibilize the alloy. Desirably, the first polymer includes such reactive or polar groups as are compatible with the second polymer, so that there is no need to add a compatibilizer as a third component of the oriented alloy.

The first polymer, i.e. polyolefin, may be present in the alloy in an amount of from about 20 to about 98 wt % of the oriented alloy. More specifically, the first polymer may be present in an amount of from about 50 to about 90 wt % or from about 70 to about 85 wt % of the oriented alloy.

The second polymer, i.e. polyester and/or polyamide, may be present in an amount of from about 1 to about 80 wt % of the oriented alloy. When more polyester and/or polyamide is present, the first polymer tends to become discontinuous, increasing the difficulty of processing the alloy. More specifically, the second polymer may be present in an amount of from about 2 to about 50 wt %, or even more specifically from about 4 to about 30 wt %, of the alloy. At these amounts, the alloy has a melt strength high enough to enable extrusion and blow molding as regular polyolefin.

The compatibilizer, when used, may be present in an amount of up to 50 wt % of the alloy. More specifically, the compatibilizer may be present in an amount of from about 2 to about 30 wt %, or from about 2 to about 15 wt % of the alloy.

It is possible that any particular polymer could be considered either a first polymer or a second polymer. For example, PET can be considered both a polyolefin (because it contains polyethylene) or a polyester (because it contains ester linkages). In such cases, the particular polymer should be considered either a first polymer or a second polymer based on whether it forms a continuous phase or a dispersed phase.

The oriented polyolefin alloys of the present disclosure are made in either a two-step process or a one-step process. In the two-step process, first, the first polymer and the second polymer, and optionally a compatibilizer are mixed together to disperse the second polymer within the first polymer and form a dispersion. A stable dispersion of polyester and/or polyamide in a molten polyolefin can be formed by intensive mixing provided by an extruder or the like. Dispersion is critical because if the dispersed phase size is greater than about 5 micrometers, the resulting product will be brittle and tend to fracture or crack under stress. The machine used for mixing the components may be a single or multiple screw mixer such as, for example, a co-rotating twin screw extruder. Melt kneading is typically used for the mixing. The resulting well-dispersed mixture of the first polymer and the second polymer can be considered an alloy. Put another way, a dispersion is formed from the first and second polymers, and the dispersion is subsequently melt kneaded to form an alloy.

This alloy is not yet oriented, and has limited creep resistance and temperature resistance. The term "temperature resistance" refers to the ability to withstand prolonged stresses at temperatures greater than 30 degrees C. One reason for these limitations is the globular geometry of the dispersed phase. The alloy is then molded or extruded into a sheet, strip, film, grid, web, profile, or tube. The resulting object is then cooled to a surface temperature of about 10 degrees C. or higher, for example by air cooling, water cooling, or by use of a chilling machine. In the second step, the object is exposed to uni-axial or multi-axial mechanical stresses, and is thus stretched or oriented. This orientation step can be performed with or without additional heating of the object.

In a globular domain, the three dimensions (length, width, height) are generally equal. In a fibril, two of the dimensions are generally equal, and the third dimension is larger than the other two dimensions. This results in a fibril, or a fibrous shape. In a lamella, two of the dimensions are generally equal, and the third dimension is significantly smaller than the other two dimensions. Put another way, a lamella has a generally plate-like shape. Both lamella and fibrils have an aspect ratio greater than 1, and are thus able to provide reinforcement.

The stretching/orienting step may be performed quickly after the extrusion/molding, when the object is still relatively hot, or the product may be allowed to cool or be actively cooled.

In an online process, the molten alloy is transferred to an extruder or blow molder or injection molding unit. Next, the molten alloy is formed into a film, web, grid, strip, profile, pipe, or sheet, then the alloy is oriented. Alternatively, the alloy is allowed to cool, then is chopped up. The chopped materials are remelted and then extruded, blow molded, or injection molded to form an object having the shape of a film, web, grid, strip, profile, pipe or sheet. The object is then oriented.

Next, tensile forces are applied to the object in one or two directions (referred to as the machine and cross-machine directions) i.e. uni-directionally or bi-directionally. If desired, tensile forces can also be applied in third or more directions. During this stretching/orientation, the surface temperature of the object should be below the melting point of the polyolefin, but high enough to enable chain mobility. The temperature thus depends on the specific polyolefin in the continuous phase. For polyethylene alloys, the surface temperature of the object may be from about 10° C. to about 100° C. For polypropylene alloys, the surface temperature of the film or sheet may be from about 10° C. to about 150° C.

In the one-step process, the melt kneading of the alloy and the molding/extrusion/orientation are done in one sequence. There is no pelletizing, rolling, or collecting of an extruded or molded object prior to orientation.

The orientation changes the aspect ratio of the dispersed phase. The aspect ratio is the ratio of the average length to the average diameter (for fibrils) or average thickness (for lamellae). Globular domains generally have an aspect ratio of 1. Under tensile forces and at an appropriate temperature, the aspect ratio will increase. Put another way, globular domains in the dispersed phase are transformed into fibrils or lamellae. In embodiments, the aspect ratio is increased to at least 2 or to at least 3. In particular embodiments, the fibrils or lamellae have a maximum average diameter or thickness of 2 micrometers and a minimum average length of 4 micrometers. Put another way, the fibrils have an average diameter or thickness of at most 2 micrometers and an average length of at least 4 micrometers.

FIG. 1 illustrates some methods for producing an oriented polyolefin alloy. A mixture of a polyolefin, an optional compatibilizer, and polyester and/or polyamide is melt kneaded 110 to form an alloy. The alloy is cooled and chopped 120 into pellets, flakes, or powder. The pellets, flakes, or powder are re-melted and extruded, molded, or blow-molded 130 to form a film, web, grid, strip, profile, pipe, or sheet. The resulting object is oriented 140 in one or more directions to form fibrils or lamellae of polyester and/or polyamide in a continuous phase of the polyolefin.

Figure 2:
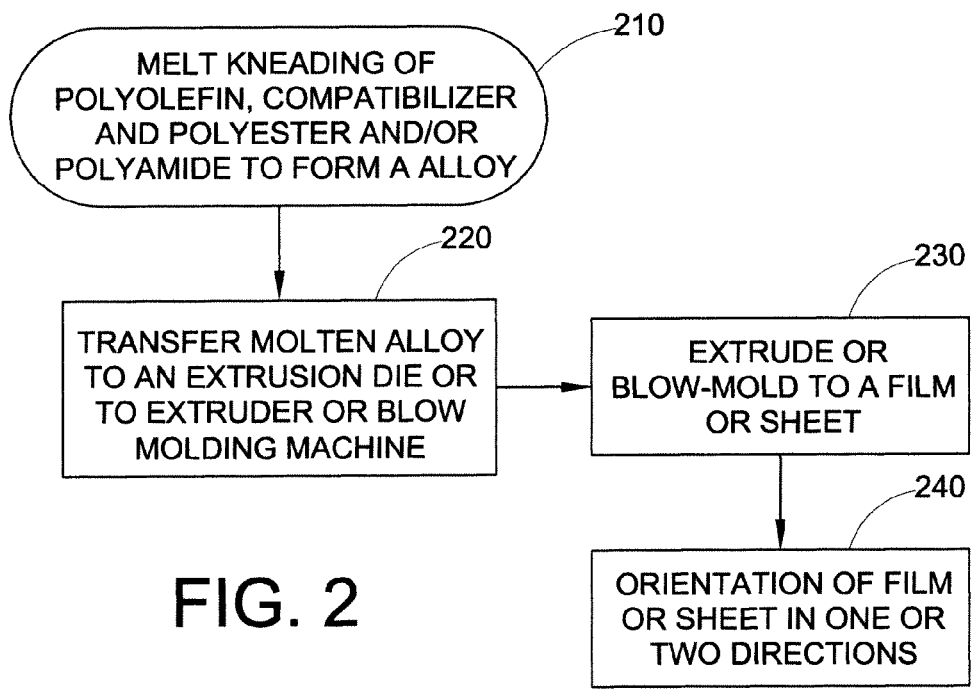
FIG. 2 is a flow chart describing another exemplary embodiment of a method for producing an oriented polyolefin alloy.

FIG. 2 illustrates a second exemplary embodiment of a method for producing a creep resistant article. A mixture of a polyolefin, an optional compatibilizer, and polyester and/or polyamide is melt kneaded 210 to form a molten alloy. The molten alloy is transferred 220 as a melt to an extrusion die, extruder, injection molding machine, or blow molding machine. The molten alloy is molded 230 to form an object in the shape of a film, web, grid, strip, profile, pipe or sheet. The molded object is oriented 240 in one or more directions to form fibrils or lamellae of polyester and/or polyamide in a continuous phase of the polyolefin.

Figure 3:
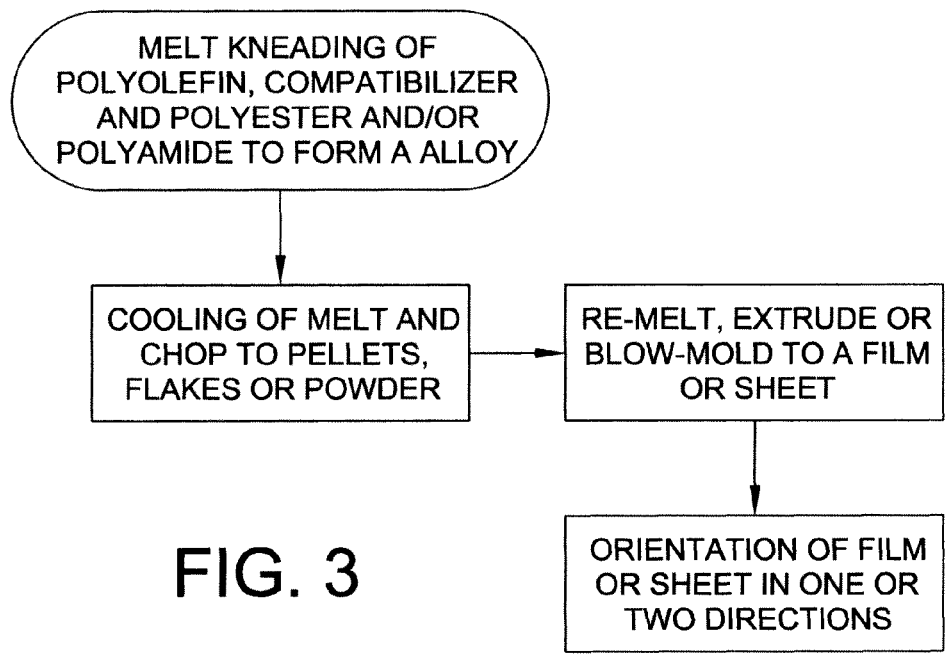
FIG. 3 is a flow chart similar to that of FIG. 1, but with different ingredients.

FIG. 3 is similar to that of FIG. 1. Here, however, the polyolefin is functionalized. The term "functionalized" refer to a portion of the polyolefin or the entire polyolefin being grafted or modified with polar or functional groups. Exemplary useful groups for the present disclosure include maleic anhydride, glycidyl methacrylate, and glycidyl acrylate. In addition, the polyolefin alloy also comprises a polar olefin copolymer. Exemplary polar olefin copolymers include ethylene-vinyl acetate (EVA) or ethylene-acrylic ester (such as Lotryl™ manufactured by Arkema).

Figure 4:
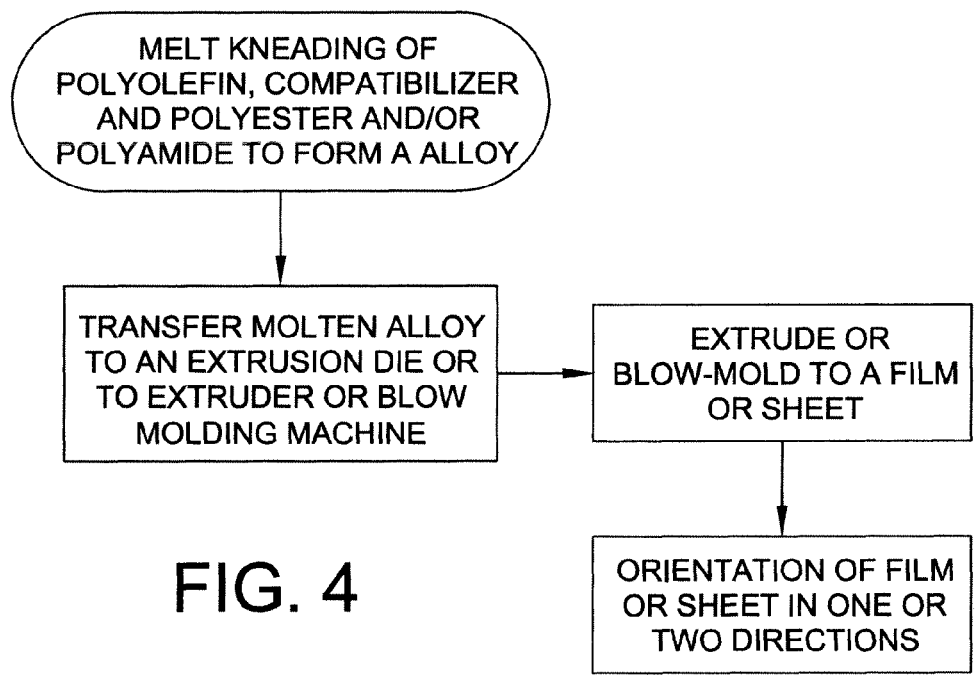
FIG. 4 is a flow chart similar to that of FIG. 2, but with different ingredients.

FIG. 4 is similar to that of FIG. 2. Here, however, the polyolefin is functionalized. In addition, the polyolefin alloy also comprises a polar olefin copolymer.

In particular embodiments, the oriented polyolefin alloy can be used to form geosynthetic articles such as a geofabric, a geogrid, a geomembrane, or a geocell. A geofabric, geogrid, and geomembrane can be considered to be two-dimensional, whereas a geocell is three-dimensional and each cell has a cell height. A geofabric is formed from synthetic fibers to form a fabric that is porous across its plane. A geogrid differs from a geofabric in that the fibers or ribs of a geogrid are formed in a gridlike configuration, with large apertures between individual ribs in the machine and cross-machine directions. A geomembrane is generally impermeable.

A geogrid can be made according to the present disclosure by applying an orientation ratio of 1:2 or higher onto a punched sheet that is extruded from the polymeric alloy. Desirably, the orientation ratio is 1:4 or higher. The orientation ratio is not the same as the aspect ratio discussed above. The polyolefin alloy is generally oriented in a machine referred to herein as an orientation unit. The orientation ratio is the ratio between the line speed after the orientation unit (i.e. after the polyolefin alloy has been oriented) to the line speed before the orientation unit. This orientation ratio can increase the aspect ratio of the dispersed phase in the oriented polyolefin alloy.

Figure 5:
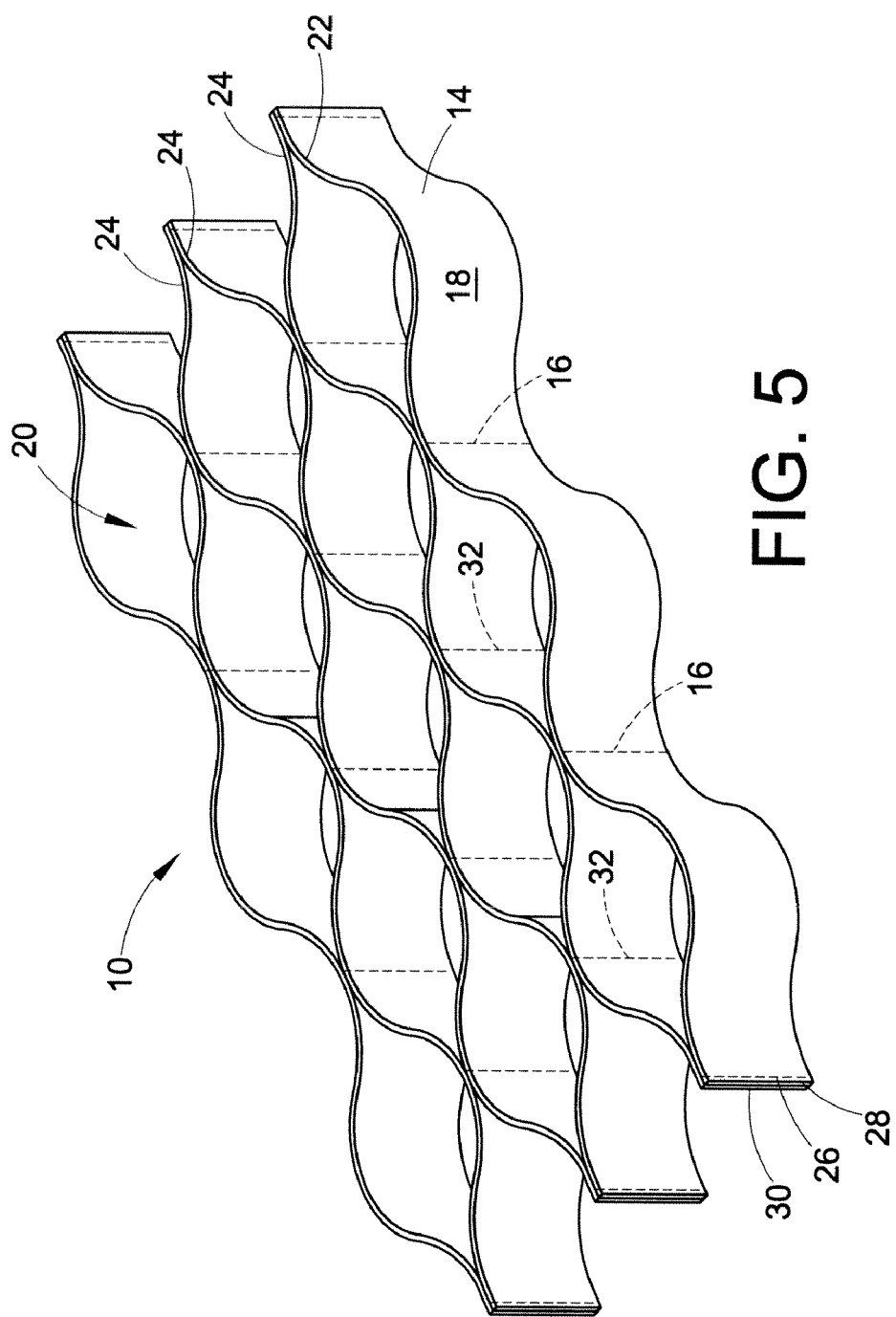
FIG. 5 is a perspective view of a geocell made from the oriented polyolefin alloy.

FIG. 5 is a perspective view of a single layer geocell. The geocell 10 comprises a plurality of polymeric strips 14. Adjacent strips are bonded together by discrete physical joints 16. The bonding may be performing by bonding, sewing or welding, but is generally done by welding. The portion of each strip between two joints 16 forms a cell wall 18 of an individual cell 20. Each cell 20 has cell walls made from two different polymeric strips. The strips 14 are bonded together to form a honeycomb pattern from the plurality of strips. For example, outside strip 22 and inside strip 24 are bonded together by physical joints 16 which are regularly spaced along the length of strips 22 and 24. A pair of inside strips 24 is bonded together by physical joints 32. Each joint 32 is between two joints 16. As a result, when the plurality of strips 14 is stretched in a direction perpendicular to the faces of the strips, the strips bend in a sinusoidal manner to form the geocell 10. At the edge of the geocell where the ends of two polymeric strips 22, 24 meet, an end weld 26 (also considered a joint) is made a short distance from the end 28 to form a short tail 30 which stabilizes the two polymeric strips 22, 24.

When geosynthetic articles are made from the oriented polyolefin alloy, they exhibit increased creep resistance. In some embodiments, the article may exhibit an allowed long term stress for design of at least 4 MPa when extrapolated according to ASTM D6992 to a reference temperature of 23° C., of at least 3 MPa when extrapolated according to ASTM D6992 to a reference temperature of 45° C., and/or of at least 3 MPa when extrapolated according to ASTM D6992 to a reference temperature of 60° C. The "allowed long term stress for design" is the stress that causes plastic deformation of less than 10% over an extrapolated time period equal to 50 years, according to ASTM D6992. In other embodiments, the article may exhibit an allowed long term stress for design of at least 10 MPa when extrapolated according to ASTM D6992 to a reference temperature of 23° C., of at least 8 MPa when extrapolated according to ASTM D6992 to a reference temperature of 45° C., and/or of at least 6 MPa when extrapolated according to ASTM D6992 to a reference temperature of 60° C.

The present disclosure will further be illustrated in the following non-limiting working example, it being understood that this example is intended to be illustrative only and that the disclosure is not intended to be limited to the materials, conditions, process parameters and the like recited herein. All proportions are by weight unless otherwise indicated.

EXAMPLE

Example 1

A creep resistant article was produced from a polyolefin composition comprising high-density polyethylene (HDPE) and polyester. An alloy was prepared from a mixture in a co-rotating twin screw extruder having a length to diameter (L/D) ratio of 40 at 270° C. The mixture comprised 15% bottle grade polyethylene terephthalate, 10% LOTADER AX 8900 compatibilizer (manufactured by Arkema), and 75% HDPE having a density of 0.945 g/cm$^3$. The molten alloy was cut into pellets and cooled to ambient temperature. The pellets were re-melted and extruded to a sheet of 1.5 mm thickness in a second extruder. The second extruder had a single screw, flat die, and three chill rolls. The surface temperature of the sheet at the last chilling roll was between 20 to 40 degrees C. The sheet was heated to a surface temperature of 55° C. using an infrared heater and oriented uni-directionally by a strap orientation machine to a draw ratio of 2. In other words, the final length of the sheet was double the original length of the sheet. Strips cut from the oriented sheet and having a width of 20 mm and a length of 100 mm were subjected to creep tests.

In the first test, a strip was loaded with a 100 N weight and maintained at 23° C. for 1,000 hours. The test was done in a computer controlled oven, typical for ASTM D6992 tests. The plastic deformation at the end of the test was 6.7%.

In the second test, a strip was loaded with a 80 N weight and maintained at 45° C. for 1,000 hours. The test was done in a computer controlled oven, typical for ASTM D6992 tests. The plastic deformation at the end of the test was 7.2%.

In the third test, a strip was loaded with a 60 N weight and heated at 60° C. for 1,000 hours. The test was done in a computer controlled oven, typical for ASTM D6992 tests. The plastic deformation at the end of the test was 5.8%.

In each of these tests, the strip exhibited an accumulated creep strain of at most 10%.

The alloys and articles of the present disclosure have been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. A creep resistant article, comprising:
    a continuous phase made of a polyolefin; and
    a dispersed phase in the form of fibrils or lamellae, made of a polyester, a polyamide, or mixtures thereof;
    wherein the dispersed phase has an average thickness of at most 2 micrometers and an average length of at least 4 micrometers wherein a ratio of the average length of the dispersed phase to the average thickness of the dispersed phase is at least 3.

2. The article of claim 1, wherein a the article, when exposed to a stress of 3.33 MPa at 23 degrees C. for 1,000 hours, exhibits an accumulated creep strain of at most 10%.

3. The article of claim 1, wherein the article, when exposed to a stress of 2.66 MPa at 45 degrees C. for 1,000 hours, exhibits an accumulated creep strain of at most 10%.

4. The article of claim 1, wherein the article, when exposed to a stress of 2 MPa at 55 degrees C. for 1,000 hours, exhibits an accumulated creep strain of at most 10%.

5. The article of claim 1, wherein the allowed long term stress for design is at least 4 MPa at 23 Celsius according to ASTM D6992.

6. The article of claim 1, wherein the allowed long term stress for design is at least 3 MPa at 45 degrees C. according to ASTM D6992.

7. The article of claim 1, wherein the allowed long term stress for design is at least 2 MPa at 60 degrees C. according to ASTM D6992.

8. The article of claim 1, having the form of a geocell, pipe, tube, agricultural film, or sheet.

9. A method for producing an oriented polyolefin alloy, comprising:
    melt kneading a precursor composition to form an alloy, the precursor composition comprising: (1) a polyolefin, (2) a second polymer selected from a polyester, a polyamide, or a mixture thereof, and (3) an optional compatibilizer; and
    applying tensile forces to the alloy, when solid or semi-molten, to form fibrils or lamellae of the second polymer dispersed within a matrix formed by the polyolefin, thereby forming an oriented polyolefin alloy.

10. The method of claim 9, further comprising cooling the alloy to a solid or semi-molten state prior to applying tensile forces.

11. The method of claim 9, further comprising transferring the alloy in a molten phase to an extruder, injection molding machine, or blow molding machine.

12. The method of claim 9, further comprising extruding, injection molding, or blow molding the alloy to form a shape prior to the formation of fibrils or lamellae.

13. The method of claim 9, wherein the tensile forces are applied until the fibrils or lamellae have an aspect ratio of at least 1.2.

14. The method of claim 9, wherein the polyolefin is polyethylene and the temperature of a surface of the alloy is from 10 to 100 degrees C. when the tensile forces are applied.

15. The method of claim 9, wherein the polyolefin is polypropylene and the temperature of a surface of the alloy is from 10 to 150 degrees C. when the tensile forces are applied.

16. The method of claim 9, wherein the alloy is stretched in one or more directions by the tensile forces.

17. An oriented polyolefin alloy comprising:
    a polyolefin matrix; and
    a second polymer dispersed within the polyolefin matrix;
    wherein the second polymer is a polyester, a polyamide, or a mixture of a polyester and a polyamide;
    wherein the second polymer is in the form of fibrils or lamellae; and
    wherein the fibrils or lamellae have an aspect ratio of at least 2.

18. The oriented polyolefin alloy of claim 17, further comprising a compatibilizer.

19. The oriented polyolefin alloy of claim 18, wherein the compatibilizer comprises a copolymer of (a) an polyolefin and (b) an acrylic acid, a methacrylic ester, or an ester or amide thereof.

20. The oriented polyolefin alloy of claim 18, wherein the compatibilizer is an ethylene-glycidyl acrylate copolymer, an ethylene-glycidyl acrylate terpolymer, an ethylene-glycidyl methacrylate copolymer, or an ethylene-glycidyl methacrylate terpolymer.

21. The oriented polyolefin alloy of claim 18, wherein the compatibilizer is a polyethylene homopolymer, polyethylene copolymer, polyethylene terpolymer, polypropylene homopolymer, polypropylene copolymer, or polypropylene terpolymer.

22. The oriented polyolefin alloy of claim 21, wherein the compatibilizer comprises maleic anhydride, glycidyl acrylate, or methacrylate functional groups.

23. The oriented polyolefin alloy of claim 20, wherein the polyolefin comprises reactive groups, polar groups, or mixtures thereof.

24. The oriented polyolefin alloy of claim 20, wherein the fibrils or lamellae have an aspect ratio of at least 3.

25. The oriented polyolefin alloy of claim 20, wherein the second polymer comprises from about 1 to about 80 wt % of the oriented polyolefin alloy.

26. A method for producing a polyolefin composition, comprising:
    forming a dispersion comprising (1) a polyolefin, (2) a polyester, polyamide, or a mixture thereof, and (3) an optional compatibilizer;
    melt kneading the dispersion to form an alloy;
    stretching the alloy to produce fibrils or lamellae of the polyester, polyamide, or mixture thereof in a matrix of the polyolefin.

27. The method of claim 26, wherein the surface temperature of the alloy during the stretching is below the melting point of the polyolefin.

28. The method of claim 26, wherein the polyolefin is polyethylene and the temperature during stretching is from about 10 to about 100 degrees C.

29. The method of claim 26, wherein the polyolefin is polypropylene and the temperature during stretching is from about 10 to about 150 degrees C.

30. The method of claim 26, further comprising cooling the alloy prior to stretching the alloy.

31. The method of claim 26, further comprising remelting, extruding, or blow molding the alloy to form a film or sheet prior to stretching.

32. The method of claim 29, wherein the alloy is stretched in two directions.

* * * * *